(12) United States Patent
Spiegel et al.

(10) Patent No.: US 12,730,334 B2
(45) Date of Patent: Sep. 8, 2026

(54) EYEWEAR FOR A SUBJECT HAVING AN EYE PROVIDED WITH A MYOPIA CONTROL SOLUTION AND ASSOCIATED METHOD

(71) Applicant: Essilor International, Charenton-le-Pont (FR)

(72) Inventors: Daniel Spiegel, Singapore (SG); Guillaume Giraudet, Orleans (FR)

(73) Assignee: Essilor International, Charenton-le-Pont (FR)

( * ) Notice: Subject to any disclaimer, the term of this patent is extended or adjusted under 35 U.S.C. 154(b) by 336 days.

(21) Appl. No.: 18/565,146

(22) PCT Filed: Jun. 17, 2022

(86) PCT No.: PCT/EP2022/066620
§ 371 (c)(1),
(2) Date: Nov. 29, 2023

(87) PCT Pub. No.: WO2022/263663
PCT Pub. Date: Dec. 22, 2022

(65) Prior Publication Data

US 2024/0272456 A1 Aug. 15, 2024

(30) Foreign Application Priority Data

Jun. 17, 2021 (EP) .................................... 21305833

(51) Int. Cl.
*G02C 7/08* (2006.01)

(52) U.S. Cl.
CPC ......... *G02C 7/081* (2013.01); *G02C 2202/24* (2013.01)

(58) Field of Classification Search
CPC ........ G02C 7/081; G02C 7/101; G02C 7/104; G02C 2202/24

(Continued)

(56) References Cited

U.S. PATENT DOCUMENTS 5,182,585 A 1/1993 Stoner
11,000,186 B2 * 5/2021 Linder .................. G02C 11/10
(Continued)

FOREIGN PATENT DOCUMENTS

WO WO 2010/088644 A1 8/2010
WO WO 2014/174067 A1 10/2014
(Continued)

OTHER PUBLICATIONS

International Search Report issued Sep. 14, 2022 in PCT/EP2022/066620 filed on Jun. 17, 2022, 4 pages.
(Continued)

*Primary Examiner* — William R Alexander
(74) *Attorney, Agent, or Firm* — Oblon, McClelland, Maier & Neustadt, L.L.P.

(57) ABSTRACT

Eyewear (1) for a subject having an eye provided with a myopia control solution, said myopia control solution inducing a temporal variation of an ocular feature of said eye, said eyewear comprising: —at least one ophthalmic lens (100) having an adjustable optical feature, to be placed in front of said eye of said subject for improving the vision of the subject; —a control unit (200), comprising one or more memories (220) and one or more processors (210), adapted to control said ophthalmic lens by setting said adjustable optical feature to a current value (CV); said one or more memories having in memory data (221) relative to said temporal variation of said ocular feature of said eye, said one or more processors being programmed to determine said current value of said adjustable optical feature based on said data.

19 Claims, 1 Drawing Sheet

(58) Field of Classification Search
USPC .......................................................... 351/159.4
See application file for complete search history.

(56) References Cited

U.S. PATENT DOCUMENTS

| | | | | |
|---|---|---|---|---|
| 11,320,674 | B2 * | 5/2022 | Kubota | G02F 1/13718 |
| 11,974,374 | B2 * | 4/2024 | Linder | H05B 47/11 |
| 2014/0036225 | A1 * | 2/2014 | Chehab | A61K 31/46<br>351/159.02 |
| 2014/0243583 | A1 * | 8/2014 | Neroev | A61N 5/0613<br>600/9 |
| 2016/0000314 | A1 * | 1/2016 | Drobe | A61B 3/0025<br>351/246 |
| 2016/0338947 | A1 * | 11/2016 | Leahy | A61K 47/32 |
| 2019/0038123 | A1 * | 2/2019 | Linder | A61B 3/112 |
| 2020/0073145 | A1 * | 3/2020 | Frutiger | G02C 7/047 |
| 2020/0142219 | A1 | 5/2020 | Rousseau et al. | |
| 2021/0329764 | A1 * | 10/2021 | Linder | G02C 11/10 |
| 2021/0356763 | A1 | 11/2021 | Le Saux et al. | |
| 2021/0356767 | A1 * | 11/2021 | Kubota | G02F 1/13718 |
| 2021/0382325 | A1 * | 12/2021 | Kubota | A61N 5/0622 |
| 2022/0283450 | A1 * | 9/2022 | Baranton | G02C 7/108 |
| 2023/0132807 | A1 | 5/2023 | Marin et al. | |
| 2023/0176399 | A1 * | 6/2023 | Bakaraju | G02C 7/021<br>351/159.69 |

FOREIGN PATENT DOCUMENTS

| | | | |
|---|---|---|---|
| WO | WO 2018/184072 | A1 | 10/2018 |
| WO | WO 2018/219828 | A1 | 12/2018 |
| WO | WO 2018/234515 | A1 | 12/2018 |
| WO | WO 2020/178166 | A1 | 9/2020 |

OTHER PUBLICATIONS

Wu et al. "Update in myopia and treatment strategy of atropine use in myopia control", The Royal College of Ophthalmologists, 2018, 33:3-13, 11 pages.

Combined Chinese Office Action and Search Report issued Sep. 9, 2025, in corresponding Chinese Patent Application No. 202280033421.7 (with English Translation), 11 pages.

* cited by examiner

EYEWEAR FOR A SUBJECT HAVING AN EYE PROVIDED WITH A MYOPIA CONTROL SOLUTION AND ASSOCIATED METHOD

TECHNICAL FIELD OF THE INVENTION

The invention relates to an eyewear for a subject having an eye provided with a myopia control solution.

It also relates to a method for determining a current value of an adjustable optical feature of an ophthalmic lens of this eyewear.

BACKGROUND INFORMATION AND PRIOR ART

Myopia is a common refractive error characterized by the fact that the eye focuses distant objects in front of its retina. Myopia is usually corrected using a concave lens providing negative dioptric power.

It has been observed that corrections based on conventional concave lenses induce on some subjects, in particular on children, an inaccurate focusing of objects located at short distance. This focusing defect causes images of close objects to be formed behind the retina and may have an impact on the progression of myopia. Recent studies suggested that the inappropriate correction provided by regular single vision lenses, inducing myopia progression, is rather happening in the peripheral retina. Images from the periphery of the field of view are focused behind the retina (i.e. hyperopic defocus) and stimulate eye elongation. Therefore, inadequate corrections may accelerate the progression of myopia. Moreover, high myopia is associated with higher risk of retinal and choroidal pathologies. Hence, slowing down myopia progression as soon as it appears is crucial, and may potentially benefit millions of children and adults worldwide.

Several methods and products have been developed to slow down myopia progression. The different methods and products known for limiting the progression of myopia are referred to as myopia control solutions and may for examples include the use of orthokeratology contact lenses (ortho-k), soft bifocal contact lenses, topical pharmaceutical agents such as atropine or pirenzepine, and progressive or bifocal ophthalmic lenses. Each subject may react differently to the different possible myopia control solutions.

Some myopia control solutions induce daily variations of the visual performance of the subject implementing one of these myopia control solutions. The time-dependent effects of these myopia control solutions typically last a few hours, for example about ten hours.

The use of atropine drops or the use of orthokeratology contact lenses are two examples of such myopia control solutions having daily time-dependent effects. Atropine drops instilled in the eyes induce pupil dilation and a decrease of the accommodative response. However, effects of atropine are time-dependent and decrease over time. When the molecule concentration drops under a physiological threshold, for example at the end of the day, pupil dilation and accommodative response of the subject return to their usual states.

Orthokeratology (ortho-k) involves the use of specially designed gas permeable contact lenses which are worn overnight by the subject. These contact lenses reshape the cornea by reducing its curvature, so the subject can see clearly the following day after removing the contact lenses. The targeted curvature of the cornea is obtained just after removing the contact lenses and the cornea progressively returns to its uncorrected shape. Hence, after some time, part of the refractive error of the eye is not corrected anymore and the visual performance of the subject decreases.

Current ways to manage these time-dependent effects comprise providing predetermined optical articles to the subject at the appropriate time. For example, just after atropine uptake the subject may wear sunglasses or photochromic lenses with predetermined transmittance features, to prevent glare. The subject can remove the sunglasses afterwards, once the initial pupil function of the eye before implementation of the myopia control solution has been recovered. To prevent the loss of visual acuity at near distances induced by atropine, the subject may wear predetermined progressive lenses. Similarly, when the effect of the lenses used in orthokeratology becomes insufficient, the subject may wear eyeglasses with predetermined vision correction lenses. The optical articles used have fixed optical features. Therefore, the subject has to choose when to use them and may even have to use different types of optical articles during the day.

SUMMARY OF THE INVENTION

Therefore one object of the invention is to provide a visual aid to the subject allowing an accurate management of the variation of the effects of the myopia control solutions while requiring minimal action from the subject.

The invention therefore proposes an eyewear for a subject having an eye provided with a myopia control solution, said myopia control solution inducing a temporal variation of an ocular feature of said eye, said eyewear comprising:

- at least one ophthalmic lens having an adjustable optical feature, to be placed in front of said eye of said subject for improving the vision of the subject;
- a control unit, comprising one or more memories and one or more processors, adapted to control said ophthalmic lens by setting said adjustable optical feature to a current value;
- said one or more memories having in memory data relative to said temporal variation of said ocular feature of said eye,
- said one or more processors being programmed to determine said current value of said adjustable optical feature based on said data.

Thanks to the eyewear according to the invention, stable and continuous visual performance of the subject is ensured throughout the day although the effects of the myopia control solution implemented by this subject vary over time. The temporal variation of the effects on the eye of the myopia control solution is taken into account when providing a visual aid to the subject. Indeed, the value of the optical feature of said ophthalmic lens can be adjusted to the current need of the subject at any time of the day in order to correct, that is to say to complete or to compensate, the changes over time in optical properties of the myopia control solution. The eyewear is therefore adapted to time-dependent effects of myopia control solutions so that the subject can experience a continuous accurate visual correction with a steady comfort over time.

Moreover, the subject has limited actions or no action to accomplish.

For example, in the case of a myopic control solution involving the use of atropine, a well-known side effect of the drug is cycloplegia, a paralysis of the ciliary muscle of the eye resulting in a decrease of the accommodative response. In this case, the ophthalmic lens of said eyewear can be designed to provide additional variable dioptric power for near vision activities. As cycloplegia decreases over time, the eye recovers its initial accommodation capacity, that is to say the accommodation capacity observed before implementation of the myopia control solution and the subject progressively needs less additional dioptric power. According to the invention, said data may then comprise data representative of the pharmacokinetic of the atropine in the eye and the variable dioptric power of the ophthalmic lens can be adjusted over time based on this pharmacokinetic data.

As another example, refractive correction induced by Ortho-k may not last all day long. As the cornea returns towards its uncorrected shape, the subject progressively needs additional negative power to remain able to see clearly objects at far distances. According to the invention, said data may then comprise data representative of the dynamic of the reshaping of the cornea to its uncorrected shape or data representative of the evolution of the curvature of the cornea with time. In this case, the variable dioptric power of the ophthalmic lens can be adjusted over time based of the dynamic of reshaping: as the cornea progressively returns to its uncorrected shape, the negative power of the ophthalmic lens of the eyewear progressively increases.

Advantageously, the eyewear according to the invention also allows taking into account side effects of the myopia control solutions in order to compensate for the side effects. For example, a side effect of atropine, with respect to myopia control, is pupil dilation, which takes place a couple of minutes after drops delivery and lasts for hours. Pupil dilation typically induces a higher sensitivity to glare. Data can comprise a variation model of the change over time of the pupil responsiveness. Here, the term "pupil responsiveness" refers to the variation of the pupil diameter in reaction to a variation of the light intensity, that is to say here the ability of the pupil to constrict when light intensity increases.

When atropine has just been provided, pupils are fully dilated and pupil responsiveness is minimal. Therefore, a small increase of the light intensity might glare the subject. By the end of the day, the subject recovers its initial pupil responsiveness, that is to say, the pupil responsiveness observed before implementation of the myopia control solution, and only a large increase of the light intensity might glare the subject. In this case, a variable transmittance of the ophthalmic lens can be determined as a function of the variation of the pupil responsiveness according to the following model: the light intensity increase triggering the darkening of the ophthalmic lens decreases over time. In other words, when using an ophthalmic lens having a variable transmittance, the value of the transmittance and/or the light intensity threshold triggering the variation in transmittance is determined based on the pupil responsiveness of the subject.

As a variant, another model could be to determine the transmittance of the ophthalmic lens as a function of the pupil diameter: when the size of the pupil decreases, the value of the transmittance increases.

Hence, the visual performance of the subject is accurately optimized throughout the day. The variable effects of the myopia control solution may be compensated in order to provide both vision comfort and vision correction. In a preferred embodiment, the subject can use a single optical article to regulate the effects of a time-dependent myopia control solution. In addition, the regulation is more accurate than with the passive optical articles currently used.

Moreover, the eyewear according to the invention is easy to use. It may be entirely automated, with no or minimal action required from the subject. It is for example particularly suited for children as they do not need to change it or to remove it nor to manually adjust it over day after taking a myopia control solution.

Other advantageous and non-limiting features of the eyewear according to the invention may be the following:

- said data are representative of a status of said ocular feature of said eye after an elapsed time since providing said myopia control solution to said eye;
- said current value of said adjustable optical feature is determined such as to correct a variable defect of the vision of the subject caused by said temporal variation of said ocular feature of said eye;
- said defect of the vision is one of the following: sensitivity to glare, inappropriate refractive power of said eye, lack of accommodative response of said eye;
- said data are representative of a period of time shorter than 48 hours or shorter than 24 hours;
- said data are based on a statistical model relative to said temporal variation of said ocular feature of said eye, said statistical model taking into account a physiological response of the subject or of a reference population or both to said myopia control solution;
- said processor is further programmed to start determining a current value of said adjustable optical feature based on an input of the subject and/or based on a predetermined schedule;
- said current value is determined based on an affine function representative of the evolution of said adjustable optical feature with time, said affine function being determined based on said data;
- said adjustable optical feature of said ophthalmic lens comprises at least one of a dioptric feature and a light transmittance feature;
- said ocular feature of said eye comprises one of the following: a pupil diameter of said eye, a pupil responsiveness of said eye, a curvature of the cornea of said eye, an accommodation capacity of said eye, a refraction of said eye;
- said myopia control solution comprises providing a drug to said eye and said data include at least one of the following: pharmacokinetic data on said provided drug, concentration of said provided drug, quantity of said provided drug;
- said myopia control solution comprises applying temporarily a contact lens to said eye in order to reshape the cornea of said eye and said data include reshaping data representative of the evolution of the shape of the cornea with time after removing said contact lens;
- said eyewear further comprises a sensor adapted to detect viewing conditions and/or to measure said ocular feature of the eye and wherein said processor is further programmed to determine said current value taking into account an output of said sensor;
- said eyewear further comprises an input unit adapted to receive information from the subject and wherein said processor is further programmed to determine said current value based on said information inputted in said input unit.

The invention also relates to a method for determining a current value of an adjustable optical feature of an ophthalmic lens to be placed in front of an eye of a subject for improving the vision of the subject, said eye of the subject being provided with a myopia control solution inducing a temporal variation of an ocular feature of said eye, said method comprising the following steps:

providing the subject with an eyewear comprising said ophthalmic lens;

determining data relative to said temporal variation of said ocular feature of said eye;

determining said current value of said adjustable optical feature of said ophthalmic lens based on said data.

DETAILED DESCRIPTION OF EXAMPLES

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings:

FIG. 1 shows a schematic representation of the eyewear according to the invention. The eyewear 1 comprises:

Figure 1:
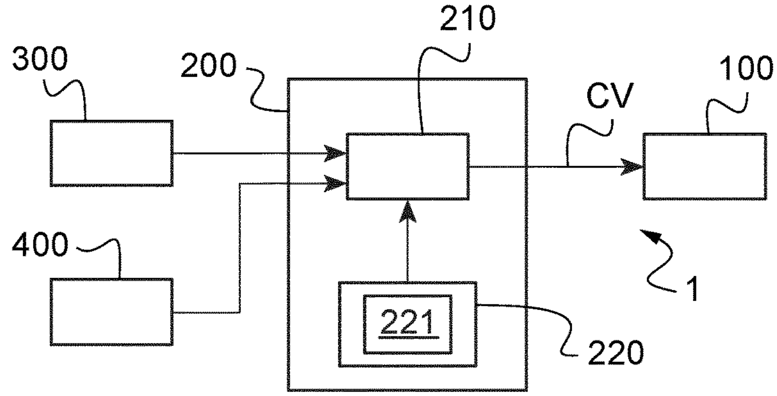
FIG. 1 is a schematic representation of an eyewear according to the invention.

at least one ophthalmic lens 100 to be placed in front of an eye of a subject for improving the vision of the subject, the ophthalmic lens 100 having an adjustable optical feature;

a control unit 200, comprising one or more memories 220 and one or more processors 210, adapted to control said ophthalmic lens 100 by setting said adjustable optical feature to a current value CV.

Said one or more memories 220 have in memory data 221 relative to a temporal variation of an ocular feature of the eye.

Said one or more processors 210 are programmed to determine a current value CV of the adjustable optical feature based on the data 221.

In practice, the eyewear 1 also comprises a frame in which the ophthalmic lens 100 is mounted.

In the embodiment presented in FIG. 1, the eyewear 1 comprises an input unit 300 adapted to receive inputs, information or signals from the subject. The input unit 300 is connected to the control unit 200. Here, the input unit 300 comprises a user interface allowing the subject to interact with the control unit 200. The user interface might for example be a touch surface on the frame of the eyewear 1 or distant device such as a smartphone belonging to the subject.

In the embodiment presented in FIG. 1, the eyewear 1 comprises a sensor 400 adapted to detect viewing conditions and/or to measure the ocular feature of the eye. Viewing conditions comprise for example an illumination state of a scene the subject is looking at. In this case, the sensor 400 might comprise a photodiode oriented towards the scene. Viewing conditions might also comprise a viewing distance.

In an embodiment, the sensor 400 comprises an image capture apparatus. The image capture apparatus may be designed to capture images of the scene that the subject is looking at, for example in order to determine whether the subject is performing a near vision task or, more generally, to determine a viewing distance. The image capture apparatus may also be designed to capture images of the eye. Based on these images, the one or more processors 210 may then be able to determine features of the eye, in particular the ocular feature of the eye.

The eyewear 1 comprises preferentially two ophthalmic lenses 100 adapted to be placed in front of each of the eyes of the subject. Only one ophthalmic lens 110 will be described hereafter. The features of the other ophthalmic lens 100 may be similar (but adapted to the other eye) to the features of the ophthalmic lens 100 described hereafter, especially when the other eye of the subject is also provided with a similar myopia control solution.

Figure 2:
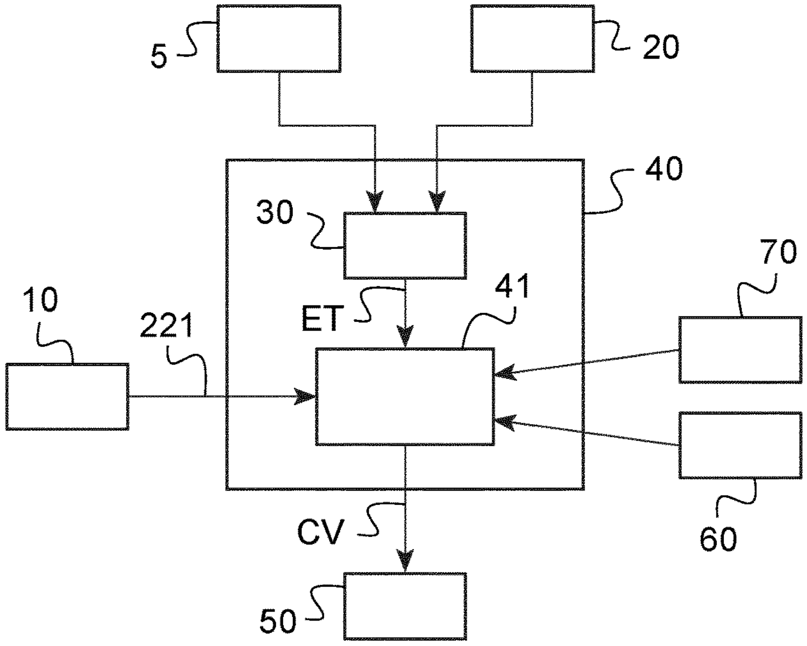
FIG. 2 is a schematic representation of the different steps of the method implemented by the eyewear according to the invention.

As described hereafter, the eyewear 1 according to the invention allows implementing a method, represented in FIG. 2, according to the invention for determining the current value CV of the adjustable optical feature of the ophthalmic lens 100.

In a preliminary step (block 5 of FIG. 2), the eye of the subject is provided with a myopia control solution which induces the temporal variation of the ocular feature of the eye.

The method comprises the following steps:

a step a) of determining the data 221 relative to the temporal variation of the ocular feature of the eye (block 10 of FIG. 2);

a step b) of providing the subject with the eyewear 1 (block 20 of FIG. 2);

a step c) of determining the current value CV of the adjustable optical feature of the ophthalmic lens 100 based on the data 221 (block 40 of FIG. 2).

Here the method also comprises a step d) comprising setting the adjustable optical feature to the current value CV (block 50 of FIG. 2).

The method according to the invention is here implemented by the control unit 200 of said eyewear 2. In particular, said one or more processors 210 are programmed to implement the method.

Myopia control solutions aim to prevent the progression of myopia with age, that is to say to prevent a long-term progression of myopia. The eyewear 1 according to the invention may be designed to compensate temporal variations of the effects of any known myopia control solution inducing temporal variations of an ocular feature of the eye.

A temporal variation of an ocular feature of the eye is here defined as an observable, i.e. for example measurable, change of the ocular feature of the eye with time. This change is relatively quick, in practice taking place within a few minutes, one or a few days at most. It is directly linked to the short-term effects of the myopia control solution on the eye of the subject. This change does not take into account a long-term evolution of the vision of the subject over months or years. For example, a temporal variation refers to a change over periods of time ranging from a few hours to a few days, for example one or two days. The observable change might be measured by means of optometric devices.

Here, the ocular feature of the eye comprises one of the following:

a pupil diameter of the eye;

a pupil responsiveness;

a curvature of the cornea of the eye;

an accommodation capacity of the eye;

a refraction of the eye.

The ophthalmic lens 100 is adapted to improve the vision of the eye of the subject in front of which the ophthalmic lens 100 is placed.

More precisely, the ophthalmic lens 100 is adapted to compensate for the variation of the effects of the myopia control solution on the vision of the subject. In particular the ophthalmic lens 100 is adapted to correct a variable defect of the vision of the subject caused by the temporal variation of the ocular feature of the eye. The temporal variation of the ocular feature of the eye is here caused by the temporal variation of the effects of the myopia control solution. In the following "to correct a variable defect of the vision of the subject caused by said temporal variation" or "to correct the effects of the myopia control solution" means either to complete a visual correction provided by the myopia control solution or to correct undesirable side effects of the myopia control solution. This improvement of the vision provided by the ophthalmic lens 100 is adaptive which, in the sense of the invention, means that the vision improvement, as perceived by the subject, remains stable over a period of time limited to 24 or 48 hours, even though the ocular feature of the eye varies.

In summary, the ophthalmic lens 100 allows maintaining appropriate vision performances for the subject despite the changing over time of the optical effects or side effects of the myopia control solution.

Moreover, the ophthalmic lens 100 may be designed to correct a permanent visual defect of the eye of the subject. For instance, the sphere power, the cylinder power and the cylinder axis of the ophthalmic lens 100 might be determined according to a standard prescription. This correction of the vision is static which, in the sense of the invention, means that it does not vary over short periods of time while the ocular feature of the eye varies over a few minutes or a few days.

Here, improving the vision of the subject comprises correcting one or more of the following defects of the vision:

sensitivity to glare;

inappropriate refractive power of the eye, comprising for example sphere power, cylinder power and cylinder axis;

lack of accommodative response of the eye.

The adjustable optical feature of the ophthalmic lens 100 of the eyewear 1 can be actively tuned or set to a specific value: the current value CV. As described hereafter, the active function of tuning the current value CV is controlled by the control unit 200. To this end, the control unit 200 comprises electronic connection elements and power supply devices such as a battery (not represented).

Here, the adjustable optical feature of the ophthalmic lens 100 for example comprises a dioptric feature and/or a light transmittance feature.

The ophthalmic lens 100 is designed so that its dioptric features can be controlled. Said dioptric features may comprise a sphere power, a cylinder power or a cylinder axis. The sphere power and the cylinder power may be a positive or a negative power. The current value CV in diopters of the power of the ophthalmic lens 100 and/or the value in degrees (or radians) of the cylinder axis of the ophthalmic lens 100 can be varied. The ophthalmic lens 100 might comprise activatable optical elements for which the index of refraction can be tuned (for example electronically or by fluid injection) in order to modify light ray focusing and therefore the dioptric power of the ophthalmic lens 100. Such lenses are for example described in U.S. Pat. No. 5,182,585A. The current value CV of the dioptric feature can for instance be changed between −2 D and 2 D by steps of ±0.1 D.

The ophthalmic lens 100 is also designed so that its light transmittance feature, hereafter referred to as transmittance, can be controlled. The ophthalmic lens 100 might be an electrochromic lens such as those described in WO2018/234515. Classically, the electrochromic lens comprises a layer of an electrochromic medium such as a liquid crystal, a composition comprising oxidizing compound and reducing compound in a solvent or a solid state electrochromic layer and electrodes to apply a voltage to the layer in order to change is transmittance. The ophthalmic lens 100 might also comprise filters and/or polarizers which can be controlled by an electrical voltage. The current value CV in percentage of the transmittance of the ophthalmic lens 100 can therefore be varied. The current value CV of the transmittance feature can for instance be changed between 10% and 90% by steps of ±5% (100% being totally transparent and 0% totally opaque).

The method according to the invention, implemented by the eyewear 1, is now described in reference to FIG. 2.

In the preliminary step, the eye of the subject is provided with a myopia control solution.

For example, the myopia control solution provided in the preliminary step may comprise providing drugs to the subject, for example to regulate retinal and scleral muscarinic receptors. Typically, atropine can be directly delivered in the eye of the subject using eye drops. Other pharmacological approaches include topical timolol, a nonselective beta-adrenergic antagonist, and oral 7-methylxanthine (7-MX), an adenosine antagonist. The effect of atropine for myopia control has been shown is several studies, such as the study of Wu, P.-C., Chuang, M.-N., Choi, J., Chen, H., Wu, G., Ohno-Matsui, K., Jonas, J. B., Cheung, C. M. G., 2019, «Update in myopia and treatment strategy of atropine use in myopia control» in Eye 33, 3-13.

Another example of myopia control solution that can be provided in the preliminary step may comprise corneal reshaping, also known as orthokeratology, which is performed by fitting a specially designed gas permeable contact lens on the eye of the subject. The contact lens worn overnight reshapes the cornea of the eye during the night to reduce the myopic refraction defect. Providing myopic defocus in the periphery retinal and/or optical aberrations by flattening the cornea may be achieved for example by using an ortho-K solution.

Other myopia control solutions in the sense of the invention may comprise performing one or more of the following actions:

a) correcting or reducing the accommodative lag during near vision activities;

b) correcting peripheral hyperopic defocus or providing myopic defocus;

c) providing retinal stimulation with light using multiple light stimuli located in front of retina of the eye of the subject;

d) providing a different contrast in peripheral vision of the subject by using a lens having a lower transmission in the region corresponding to peripheral vision;

e) limiting the amount of red light entering the eye to reduce chromatism of the eye;

f) providing light having a specific wavelength to the eye to inhibit eye lengthening;

g) providing dynamically varying light stimuli such as flickering in order to decrease the contrast on the periphery of the retina by activating/deactivating diffusing elements according to the flickering frequency;

k) providing myopic defocus in the periphery retinal and/or optical aberrations by flattening the shape of the cornea.

Step a) of the method according to the invention (block 10 of FIG. 2), wherein the data 221 are determined, may be performed autonomously from the other steps, meaning in particular that it may be performed before the other steps.

Preferentially, step a) is performed before the preliminary step (block 5 of FIG. 2), wherein the eye is provided with the myopia control solution, and step b) (block 20 of FIG. 2). For instance step a) is performed a few days before them, so that the data 221 may be already stored on the one or more memories 220 when providing the eyewear 1 to the subject.

Alternatively, part or all of the data 221, stored in said one or more memories 220, may be determined while the subject wears the eyewear 1.

In a general manner, the data 221 describe a correlation between the ocular feature of the eye, for which the temporal variation is induced by the myopia control solution, and time.

More specifically, the data 221 are representative of a status of the ocular feature of the eye after an elapsed time since providing the myopia control solution to the eye. In other words, the data 221 define a relationship, for example by means of a function or a value table, between the status of the ocular feature of the eye and the elapsed time. The data 221 may also relate to temporal variations of several physical features of the eye.

Here, the status of the ocular feature of the eye refers either to a quantifiable value or a qualitative value of the ocular feature of the eye.

The quantifiable value of the ocular feature may for example comprise a value of a pupil diameter, a value of a curvature of the cornea, a value of a refraction power of the eye, an accommodation etc. . . . . It may be measured, estimated or calculated.

The qualitative value of the ocular feature of the eye may for example comprise a value representative of a sensitivity to glare or of a discomfort of the subject. The value may rate the ocular feature on a scale, for example a scale from 1 to 3 or from low to medium to high.

In an embodiment, the data 221 are based on a statistical model relative to the temporal variation of the ocular feature of the eye in response to the myopia control solution.

Figure 3:
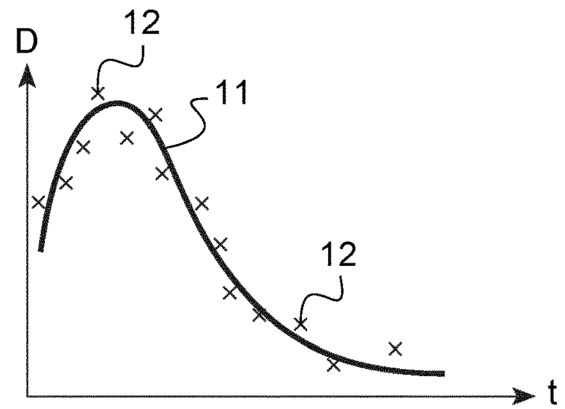
FIG. 3 is a schematic graphical representation of the evolution of an ocular feature of an eye provided with a myopia control solution.

An example of a statistical model is represented in FIG. 3. Here, the statistical model is a function, which graphical representation is a curve 11, obtained by fitting reference data comprising a plurality of measured values 12 of the ocular feature. Then, the data 221 comprises a mathematical equation of the function or sampling points of the function.

The measured values 12 of the reference data may be collected during a collection step wherein said ocular feature of the eye of one or a plurality of reference subjects are measured at several predetermined times after providing them with the myopia control solution, for example at regular time intervals. Each measured value is stored in association with a temporal indicator representative of the time interval between providing the myopia control solution and the acquisition of the measured value.

The statistical model can take into account a physiological response of the subject, and/or of the reference subjects, to the myopia control solution. The physiological response of the subject, respectively of the reference subjects, may comprise the temporal variation of the ocular feature of the eye, for example the temporal variation of a mean value of the ocular feature. The physiological response of the subject, respectively of the reference subjects, may also comprise any other information derived from the subject, respectively of the reference subjects, for example a blood concentration of the administered drug. Preferentially, the reference subjects share common features with the subject such as age, degree of myopia, speed of change of the myopia, etc.

When the statistical model takes into account the physiological response of the subject itself, the statistical model is personalized and therefore more suited to the subject. Such a personalized model may for example be established during a test session wherein, after providing the myopia control solution to the eye, the physiological response of the subject is studied. The reference subjects may therefore include the subject himself. The data 221 may then be completed in real time to take into account the data obtained from the subject himself.

Typically, the study is carried out by performing measurements on the subject at regular time intervals. The study may be carried out by an eye care professional.

The study may also be at least partly carried out by the subject himself, for example by auto-assessing his quality of vision or his discomfort. For example, in the embodiment wherein the eyewear 1 comprises an input unit 300, the subject may auto-assess his physiological response by means of the input unit 300. Thanks to the input unit 300, he can for example tune by himself the sphere power of the ophthalmic lens 100 in order to maintain his quality of vision over the test session. In this case, the control unit 200 memorizes the successive inputs of the subject in order to provide a similar adaptive dioptric power the next time the subject uses the eyewear 1 after the myopia control solution.

When the myopia control solution comprises providing a drug, the data 221 include pharmacokinetic data on the drug and/or the concentration of a solution in which the drug is provided to the subject, together with the volume of the solution, and/or the quantity of drug provided to the subject.

As a variant, the determination of the data 221 might also consist in retrieving pre-existing data, for example from a distance server, or choosing between several models, for example several statistical models, which are already stored in the one or more memories 220

Providing the eyewear 1 to the subject (block 20 of FIG. 2) is preferentially performed rapidly after providing the myopia control solution (block 5 of FIG. 2).

Step b) comprises the subject putting on the eyewear 1. At the end of step b), the eyewear 1 is worn by the subject and the ophthalmic lens 100 is located before the eye of the subject. In practice, the subject may perform step b) by himself.

In step c), the one or more processors 210 determine, based on the data 221, the current value CV of the adjustable optical feature of the ophthalmic lens 100 (block 40 of FIG. 2).

In a sub-step of step c), a value of the elapsed time ET is determined (block 30 of FIG. 2) and provided to said one or more processor 210.

The elapsed time ET is determined, that is to say here timed or measured, from an initial time. In other words, the elapsed time ET is here defined as the difference between the initial time and a current time which corresponds to the moment the control unit 200 is determining the current value CV.

The elapsed time may be determined thanks to a timer integrated to said eyewear. Said timer measures the time elapsed since the initial time.

The initial time corresponds here to the end of providing the myopia control solution, which is here also the moment from which the ocular feature of the eye undergoes the temporal variation to return to its usual state uncorrected by the myopia control solution. For example, the initial time might correspond to the moment a drug is administered to the eye; in this case, the administration of the drug is both the beginning and the end of providing the myopia control solution. As another example, the initial time might correspond to the removal of ortho-K contact lenses.

The initial time might be determined based on a predetermined schedule. For example the initial time might be, every day, a predetermined hour. It might also be determined based on an input of the subject, for example by means of the input unit 300. For instance, the subject may indicate directly and manually the initial time or, when putting the eyewear 1 on, he may indicate how long ago the providing of the myopia control solution ended.

As a variation, the initial time might correspond to the moment the subject is provided with the eyewear 1. For example, it might be determined based on a signal generated by the sensor 400 when the sensor 400 detects that the subject puts on the eyewear 1.

Based on the data 221 and the elapsed time ET, the one or more processors 210 determine the current value CV (block 41 in FIG. 2). Firstly, based on the data 221 and the elapsed time ET, the one or more processors 210 determine the status of the ocular feature of the eye. Then, based on the status of the ocular feature of the eye, the one or more processors 210 determine the current value CV such as to correct the variable defect of the vision of the subject caused by the temporal variation of the ocular feature of the eye.

Preferably, the one or more memories 220 also have in memory optical data relative to a relationship between the ocular feature of the eye and the current value CV. Here, the optical data are comprised in the data 221. Using the optical data, the one or more processors 210 determine the current value CV based on the status of the ocular feature of the eye.

The optical data define a relationship, here a bijective relationship, between a quantitative or qualitative value of the ocular feature and the current value CV. For example, the optical data comprise a monotonic function giving, for a predetermined value of the curvature of the cornea of the eye, a predetermined value of the sphere power, cylinder power or cylinder axis of the ophthalmic lens 100.

The optical data may also comprise a monotonic function giving, for a predetermined value of the diameter of the pupil of the eye, a predetermined value of the transmittance of the ophthalmic lens 100 according to a surrounding light intensity.

They may comprise a monotonic function giving, for a predetermined value of the accommodative capacity of the subject, a predetermined value of the sphere power of the ophthalmic lens 100. The accommodation of the subject may be measured as equal to the near point of accommodation viewing distance of the subject, which may be considered in diopters (inverse of said viewing distance). The monotonic function is determined such that the system comprising the eye of the subject and the ophthalmic lens 100 has a refractive power corresponding to the inverse of said viewing distance measured, i.e. corresponding to the accommodation value measured. Alternatively, said monotonic function may be determined such that if the accommodation value measured is lower than a reference accommodation value, the difference between them is added to the sphere power of the ophthalmic lens 100. The reference accommodation value is for example 4 D. This value is particularly well adapted for kids who generally read at very closes distances, typically around 25 centimeters.

Preferably, said optical data take into account how the eyewear 1 is worn by the subject. More precisely, the optical data take into account geometrico-morphological features of the subject such as interpupillary distance and/or fitting parameters of the eyewear placed on the head of the subject, such as an eye-lens distance or a fitting height.

In an embodiment, the one or more processors 210 also determine the current value CV taking into account an input from the subject generated via the input unit 300 (bloc 60 FIG. 2). Although the current value CV of the ophthalmic lens 100 is adapted to correct the defect of vision, the subject might perceive the current value CV as inappropriate and, thanks to the input unit 300, modify it. For example, a preliminary current value may be firstly determined based only on the data 221 and the elapsed time ET and, then, the preliminary current value may be corrected to the current value CV based on the input of the subject. This might help personalize the determination of the current value CV, for instance when the data 221 are based on a statistical model determined based on data collected on reference subjects.

Moreover, the input of the subject may be recorded and integrated to said data 221, in order to personalize the data 221 for future use of the eyewear 1 by the subject. During an ulterior use of the eyewear 1 by the subject, the control unit 200 may take into account the input of the subject previously recorded and determine the current value CV such that the subject perceives it as appropriate without further adjustment. More generally, the input of the subject can also be taken into account in the statistical model on which the data 221 are based. The input of the subject can therefore also be taken into account for ulterior use of other eyewears worn by other subjects.

In an embodiment, the data 221 comprise predetermined values of the optical feature of the ophthalmic lens 100. The subject can then choose the current value CV among the predetermined values by means of the input unit 300.

Step c) may be performed in real-time, that is to say continuously or at predetermined time intervals, for example every 5 minutes or every hour. In consequence, the elapsed time ET is repeatedly determined from the moment the eyewear 1 is provided to the subject.

Step c) may also be performed on-demand from the subject. To this end, the subject may for example indicate, with the input unit 300, that the correction provided by the ophthalmic lens 100 is not appropriate. The elapsed time ET is thus punctually determined on-demand.

Step c) may also be performed based on a signal generated by the sensor 400. The elapsed time ET is thus punctually determined at the moment the control units 200 receives the signal.

In step d), once the current value CV is determined by the control unit 200 (block 40 of FIG. 2), the control unit 200 sets the adjustable optical feature of the ophthalmic lens 100 to the current value CV (block 50 of FIG. 2).

After step d) is performed, the adjustable optical feature is then equal to the current value CV. The defect at said current time by the temporal variation of the effect of the myopia control solution on said ocular feature of the eye is therefore corrected.

Step d) is automatically performed after step c) is performed. In other words, as soon as the current value CV is determined step d) is immediately performed.

In a first embodiment, the myopia control solution comprises administering atropine drops to the eye of the subject. Here, the initial time corresponds to the administration of the atropine drops. Atropine mainly induces a temporal variation of the following physical features of the eye: the pupil diameter, the pupil responsiveness and the accommodative response. After the administration of the atropine drops, they undergo temporal variations and progressively return to their initial state prior to the administration of the atropine.

In this first embodiment, the eyewear 1 is designed such that both the transmittance and the dioptric features of the ophthalmic lens 100 can be adjusted. The ophthalmic lens 100 is thus adapted to correct an increased sensitivity to glare and/or a lack of accommodative response caused by the temporal variation of the pupil diameter and/or the accommodative response.

Here, the data 221 are relative to the evolution of the pupil diameter with time and of the evolution of the lack of accommodative response with time. The curve 11 illustrated in FIG. 3 is a typical example of the evolution of the pupil diameter, referenced "D", over time after administration of atropine drops, referenced "t". The data 221 comprise a mathematical representation of a function describing the evolution of the pupil diameter over time. As described above, this function is determined by fitting measured values 12, for example obtained from the subject during a test session. Here, the data 221 are more specifically relative to the evolution of the pupil responsiveness with time, that is to say the evolution of the pupil ability to constrict when the light intensity increases.

In step c), the control unit 200 determines the transmittance of the ophthalmic lens 100 based on the elapsed time ET and on a control signal generated by the sensor 400 (block 70 FIG. 2). Here, based on the data 221 and on the elapsed time ET, the control unit 200 determines the pupil responsiveness. The control signal is here representative of a light intensity or a level of illumination of the scene that the subject is looking at.

Thanks to the sensor 400, the transmittance of the ophthalmic lens 100 can be accurately determined and suited to the needs of the subjects by taking into account the surrounding light intensity. Based on the control signal, the control unit 200 is programmed to determine the current value CV of the transmittance taking into account the value of the pupil diameter determined based on the data 221, the elapsed time ET and the surrounding light intensity. For instance, the subject has a larger pupil diameter in a dimly lit room. Based on the control signal indicating that the surrounding light intensity is very low, the control unit 200 can be programmed to set the current value CV of the transmittance to a value higher than the value only determined based on the data 221 and the elapsed time ET. Conversely, in a very bright environment, the control unit 200 can set the current value CV of the transmittance to a value lower than the value only determined based on the data 221 and elapsed time ET.

Here, the optical data may for example define a bijective relationship between the pupil responsiveness and a light intensity threshold. The light intensity threshold is here defined as a light intensity above which the subject feels a discomfort and therefore corresponds to a glare discomfort threshold. The light intensity threshold can be determined for a given pupil diameter and then extrapolated to other pupil diameters while keeping a constant retinal illumination. For instance, if the light intensity threshold is obtained with an extended light source of 1000 cd/$m^2$ for a pupil diameter of 2 mm, the light intensity threshold for a 10 mm pupil diameter will be 40 cd/$m^2$, in order to get the same retinal illuminance of 3141 Troland in both conditions. In practice, the larger the pupil diameter is, for example in millimeters, the lower is the light intensity threshold.

When the light intensity measured by the sensor 400 varies and exceeds the light intensity threshold, the current value CV of the transmittance of the ophthalmic lens 100 decreases. The variation of the lack of pupil responsiveness, that is to say the inability of the pupil to constrict due to the atropine, is therefore counterbalanced by an adjustable light intensity threshold.

The relation between light intensity and the transmittance can be linear or following a specific function. For instance, when the transmittance decrease is triggered, the current value CV of transmittance can be set to a predetermined constant value, for example 20% of transmittance, to a predetermined value depending on the pupil responsiveness and/or the light intensity or can be set in order to keep the retinal illuminance at a predetermined level.

Here, the light intensity threshold decreases over time since at the end of the day the pupil diameter returns to its initial value and the subject recovers its initial pupil responsiveness.

In an embodiment, an external sensor which is not included in the eyewear 1 may be used in combination with the eyewear 1. Here, the external sensor is remotely located in an external device such as a smartphone or a connected watch. In this embodiment, the eyewear 1 comprises a communication module (not represented) allowing the control unit 200 to receive an external control signal generated by the external sensor, here by wireless communication. The communication module is for example embedded in the frame of the eyewear. Here, the communication module more generally allows the control unit 200 to communicate with the external device, that is to say to ask for and receive the external control signal from the external device. In practice, the external control signal is relative to a surrounding light intensity, and may be representative of whether the wearer is indoors or outdoors, with a sunny day or a cloudy day, etc. The control unit 200 can then assess viewing conditions based on the external control signal, in particular the surrounding light intensity or the level of illumination of the scene that the subject is looking at.

In an alternative, when the eyewear 1 does not comprise a sensor, the control unit 200 may determine the pupil diameter based on the elapsed time ET and then determine, based on the optical data, the current value CV of the transmittance which is adequate for the pupil diameter. The optical data may for example define a bijective relationship between the pupil diameter and the current value CV of the transmittance. In practice, the larger the pupil diameter is, for example in millimeters, the lower is the current value CV, for example in percentage, of the transmittance. The increased sensitivity to glare induced by the atropine is therefore counterbalanced by the adjustable transmittance of the ophthalmic lens 100.

In step c), the control unit 200 also determines the dioptric features of the ophthalmic lens 100 based on the elapsed time ET. Here, the control unit 200 determines the accommodative response or the lack of accommodative response based on the elapsed time ET and then determines, based on the optical data, the current value CV of one or more dioptric features. The optical data may for example define bijective relationships between the lack of accommodative response and the current value CV of the sphere power and/or the current value CV of the cylinder power and/or the current value CV of the cylinder axis. For instance, the greater the lack of accommodative response is the greater is the current value CV, for example in diopter, of the sphere power. The lack of accommodative response induced by the atropine is therefore counterbalanced by the adjustable dioptric features of the ophthalmic lens 100.

The control unit 200 may also determine the current value CV taking into account an input from the subject generated via the input unit 300 (bloc 60 FIG. 2). For example, the subject might estimate that the transmittance of the ophthalmic lens 100 is not sufficient. The control unit 200 then corrects, based on the input of the subject, the preliminary current value to the current value CV such that the subject feels the transmittance to be appropriate. In the same way, the subject may adapt the dioptric features of the ophthalmic lens 100 when he perceives that his accommodative response is not appropriate.

The sensor 400 may also be used to correct the lack of accommodative response. The control unit 200 may determine one of the dioptric features of the ophthalmic lens 100, for example the sphere power, cylinder power or cylinder axis, taking into account a control signal generated by the sensor 400. For example, the sensor 400 may generate a control signal when the sensor 400 detects that the subject is performing a near vision task. In this case, the control unit 200 provides additional sphere power. The current value CV of the sphere power is then greater than the current value CV that would have been determined based only on the data 221 and the elapsed time ET.

The sensor 400 may also be used to determine a measured value of the ocular feature of the eye. For example, the sensor 400 may measure the pupil diameter by means of the image capture apparatus and determine, based on the pupil diameter, a measured value of the pupil responsiveness. The control unit 200 then corrects, based on the measured value of the ocular feature, the preliminary current value to the current value CV. The current value CV is then personalized for the subject when the data 221 are based on a statistical model determined based on a reference population.

In an embodiment, the eyewear comprises a light source, here a LED, which is for example embedded in the frame. The LED is designed to send light to the eye, for example one or more very short pulses of light. The sensor 400 then measures the pupil constriction induced by the pulsed light emitted by the LED and then determines the pupil responsiveness. The pupil responsiveness can be determined by the sensor 400 at predetermined moments of the day, for example when the eye is supposed to recover its initial pupil responsiveness.

In a second embodiment, the myopia control solution consists in providing a specially designed gas permeable contact lens to the subject. The subject wears it overnight. When being worn, the contact lens reshapes the cornea by reducing its curvature and therefore decreases the refractive power of the eye. The contact lens mainly induces a temporal variation of the refractive power of the eye. Here, the initial time corresponds to removing the contact lens. After removing the contact lens, the curvature of the cornea undergoes a temporal variation, here increases, and progressively returns to its uncorrected shape prior to the use of the contact lens. The refractive power of the eye thus decreases over time.

In this second embodiment, the eyewear 1 is designed such that the dioptric features of the ophthalmic lens 100 can be adjusted. The ophthalmic lens 100 is thus adapted to correct an inappropriate refractive power of the eye caused by the temporal variation of the curvature of the cornea.

In this embodiment, the data 221 are relative to the evolution of the curvature of the cornea over time. The data 221 include reshaping data representative of the evolution of the shape of the cornea over time after removing the contact lens. Here, the data 221 comprise a mathematical representation of a function describing the evolution of the curvature of the cornea with time. As described above, this function is determined by fitting measured values, for example obtained from the subject during a test session.

In step c), the control unit 200 also determines the dioptric features of the ophthalmic lens 100 tacking into account the elapsed time ET. Here, the control unit 200 determines the curvature of the cornea based on the elapsed time ET and then determines, based on the optical data, the current value CV of one or more dioptric features. The optical data may for example define bijective relationships between the curvature of the cornea and the current value CV of the sphere power and/or the current value CV of the cylinder power and/or the current value CV of the cylinder axis. For instance, the lower the curvature of the cornea is, the lower is the current value CV, for example in diopter, of the sphere power.

In this second embodiment, the ophthalmic lens 100 progressively provides more refractive power to the subject. Indeed, as the effects of the orthokeratology diminish, that is to say as the cornea returns towards its uncorrected curvature, the subject needs more refractive power. The inappropriate refractive power of the eye is therefore counterbalanced by the adjustable dioptric features of the ophthalmic lens 100.

Here, the data 221 may comprise a linear relationship between the elapsed time ET and the dioptric features of the ophthalmic lens 100. For example, the control unit 200 may add −0.1 D every hour to the current value CV of the spherical power of the ophthalmic lens 100.

As in the first embodiment, the current value CV may be determined by the control unit 200 taking into account information coming from the input unit 300 and/or the sensor 400.

For example, the control unit 200 may determine the current value CV taking into account an input from the subject generated via the input unit 300 (bloc 60 FIG. 2). For example, the subject might estimate that the refractive power provided by the ophthalmic lens 100 is not sufficient. The control unit 200 then corrects, based on the input of the subject, the preliminary current value to the current value CV.

In another example, the control unit 200 may also determine the current value CV taking into account a control signal generated by the sensor 400 (bloc 70 FIG. 2). For example, the eyewear 1 may comprise a series of light sources (not represented), here a series of LEDs, for example embedded in the frame. The light sources are designed to project a pattern on the cornea. Here, the pattern is made of small dots and for example aligned on a regular grid. The sensor 400 is adapted to capture an image of this pattern. An initial pattern is imaged by the sensor 400 at the initial time, just after removing the orthokeratology lens. This initial pattern corresponds to the targeted shape of the cornea having said targeted curvature which accurately corrects the myopia of the subject. Later on, a current pattern is imaged by the sensor 400. By comparing the current pattern to the initial pattern, the sensor 400 is able to determine the current state of the curvature of the cornea or a curvature variation with respect to the targeted shape of the cornea. This comparison is for example performed by analyzing distance variations between dots. For example, when the cornea recovers its uncorrected shape, the distance between dots increases. Based on the current state of the curvature of the cornea or the curvature variation, the control unit 200 can determine the current value CV of the ophthalmic lens 100.

Still in example, the sensor 400 may generate a control signal when the sensor 400 detects that the subject is performing a near vision task. In this case, the control unit 200 for example provides additional sphere power, cylinder power or cylinder axis. The current value CV of the sphere power is then greater than the current value CV that would have been determined based only on the data 221 and the elapsed time ET.

Other devices and methods for assessing the physical feature of the eye and providing instantaneous indications may also be implemented. For example, augmented reality combined with autorefraction might be used. The physical feature of the eye, for example the accommodation response, may then be instantaneously determined at desired times. Those devices may be comprised in the eyewear 1 itself or may communicate with the eyewear, for example by means of the communication unit.

The invention claimed is:

1. An eyewear for a subject having an eye provided with a myopia control solution, said myopia control solution inducing a temporal variation of an ocular feature of said eye and the myopia control solution being distinct from the eyewear, said eyewear comprising:

at least one ophthalmic lens having an adjustable optical feature, to be placed in front of said eye of said subject for improving vision of the subject;

control circuitry having one or more memories and one or more processors adapted to control said ophthalmic lens by setting said adjustable optical feature to a current value, said one or more memories having in memory data relative to said temporal variation of said ocular feature of said eye, and said one or more processors being programmed to determine said current value of said adjustable optical feature based on said data.

2. The eyewear according to claim 1, wherein said data are representative of a status of said ocular feature of said eye after an elapsed time since providing said myopia control solution to said eye.

3. The eyewear according to claim 2, wherein said current value of said adjustable optical feature is determined such as to correct a variable defect of the vision of the subject caused by said temporal variation of said ocular feature of said eye.

4. The eyewear according to claim 2, wherein said data are representative of a period of time shorter than 48 hours.

5. The eyewear according to claim 1, wherein said current value of said adjustable optical feature is determined such as to correct a variable defect of the vision of the subject caused by said temporal variation of said ocular feature of said eye.

6. The eyewear according to claim 5, wherein said data are representative of a period of time shorter than 48 hours.

7. The eyewear according to claim 5, wherein said defect of the vision is one of the following:

sensitivity to glare;

inappropriate refractive power of said eye; and lack of accommodative response of said eye.

8. The eyewear according to claim 7, wherein said data are representative of a period of time shorter than 48 hours.

9. The eyewear according to claim 1, wherein said data are representative of a period of time shorter than 48 hours.

10. The eyewear according to claim 1, wherein said data are based on a statistical model relative to said temporal variation of said ocular feature of said eye, said statistical model taking into account a physiological response of the subject or of a reference population or both to said myopia control solution.

11. The eyewear according to claim 1, wherein said one or more processors is further programmed to start determining a current value of said adjustable optical feature based on an input of the subject or based on a predetermined schedule.

12. The eyewear according to claim 1, wherein said current value is determined based on an affine function representative of evolution of said adjustable optical feature with time, said affine function being determined based on said data.

13. The eyewear according to claim 1, wherein said adjustable optical feature of said ophthalmic lens comprises at least one of a dioptric feature and a light transmittance feature.

14. The eyewear according to claim 1, wherein said ocular feature of said eye comprises one of the following:

a pupil diameter of said eye;

a pupil responsiveness of said eye;

a curvature of a cornea of said eye;

an accommodation capacity of said eye; and a refraction of said eye.

15. The eyewear according to claim 1, wherein said myopia control solution comprises providing a drug to said eye and said data include at least one of the following: pharmacokinetic data on said provided drug, concentration of said provided drug, quantity of said provided drug.

16. The eyewear according to claim 1, wherein said myopia control solution comprises applying temporarily a contact lens to said eye in order to reshape a cornea of said eye and said data include reshaping data representative of evolution of a shape of the cornea with time after removing said contact lens.

17. The eyewear according to claim 1, wherein said eyewear further comprises at least a sensor adapted to detect viewing conditions or to measure said ocular feature of the eye and wherein said processor is further programmed to determine said current value taking into account an output of said sensor.

18. The eyewear according to claim 1, wherein said eyewear further comprises an input circuit adapted to receive information from the subject and wherein said one or more processors is further programmed to determine said current value based on said information inputted in said input circuit.

19. A method for determining a current value of an adjustable optical feature of an ophthalmic lens to be placed in front of an eye of a subject for improving vision of the subject, said eye of the subject being provided with a myopia control solution inducing a temporal variation of an ocular feature of said eye, said method comprising:

providing the subject with an eyewear having said ophthalmic lens, the eyewear being distinct from the myopia control solution;

determining data relative to said temporal variation of said ocular feature of said eye; and determining said current value of said adjustable optical feature of said ophthalmic lens based on said data.

* * * * *